March 24, 1959     H. H. HAASE     2,879,016
IN-FLIGHT REFUELING ASSEMBLY
Filed Jan. 24, 1955     4 Sheets-Sheet 1

INVENTOR.
Harry H. Haase
BY
*Franz O. Ohlson, Jr.*
ATTORNEY.

March 24, 1959

H. H. HAASE 2,879,016

IN-FLIGHT REFUELING ASSEMBLY

Filed Jan. 24, 1955

INVENTOR.
Harry H. Haase

BY
Franz O. Ohlson Jr.
ATTORNEY.

March 24, 1959 H. H. HAASE 2,879,016
IN-FLIGHT REFUELING ASSEMBLY
Filed Jan. 24, 1955 4 Sheets-Sheet 3

INVENTOR.
Harry H. Haase
BY
ATTORNEY.

March 24, 1959 H. H. HAASE 2,879,016
IN-FLIGHT REFUELING ASSEMBLY
Filed Jan. 24, 1955 4 Sheets-Sheet 4

INVENTOR.
Harry H. Haase
BY
Franz O. Ohlson, Jr.
ATTORNEY.

United States Patent Office 2,879,016
Patented Mar. 24, 1959

2,879,016

IN-FLIGHT REFUELING ASSEMBLY

Harry H. Haase, Uniondale, N.Y., assignor to Republic Aviation Corporation, near Farmingdale, N.Y., a corporation of Delaware Application January 24, 1955, Serial No. 483,666

6 Claims. (Cl. 244—135)

This invention relates in general to aircraft and more particularly to the refueling of aircraft in flight or in-flight refueling.

Among other objects, the present invention contemplates an assembly or apparatus for transferring fuel from one aircraft to another during flight, which assembly may be retracted into or extended from the aircraft with which it is associated, and which embodies means whereby the delivery of the fuel may be controlled by the receiving aircraft.

This invention essentially resides in a means by which any type of aircraft may be converted into a tanker or returned to its original functional purpose with little or no structural change or modification. In short, it is proposed hereby to convert a standard operational aircraft into a tanker as a substitute for a specially designed aircraft whose only function is to be a tanker, and thereby reduce the number of aircraft required for a tactical unit.

With the above and other objects in view, as will be apparent, this invention consists in the construction, combination and arrangement of parts, all as hereinafter described, claimed and illustrated in the accompanying drawings wherein:

Figure 1:
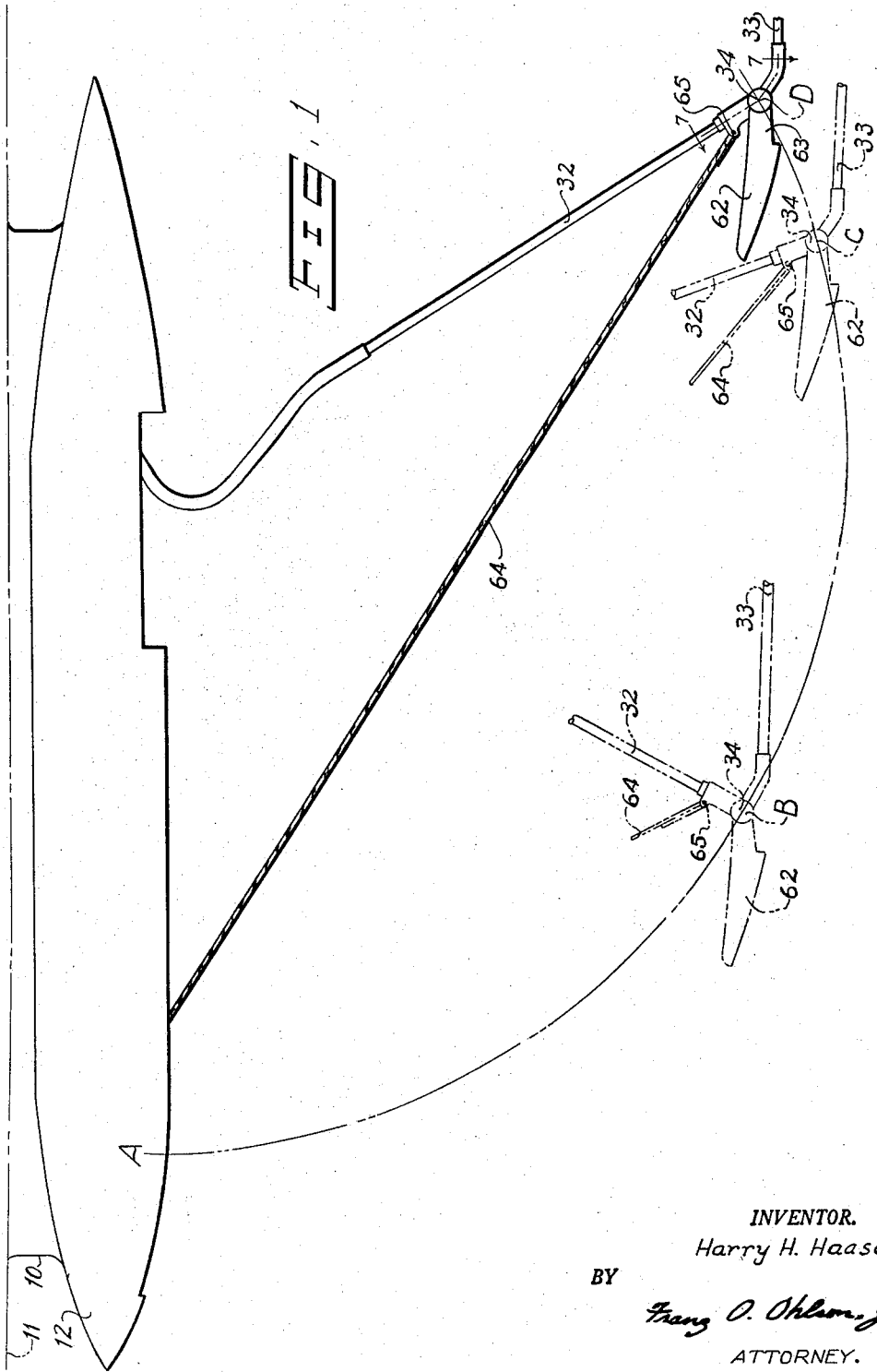
Fig. 1 is a fragmentary side elevation of an external fuel tank releasably associated with an aircraft and embodying the in-flight refueling assembly contemplated herein.

Heretofore, it has been the practice in in-flight refueling to utilize a flexible hose for transferring the fuel from one aircraft to another. Moreover, it has been the practice to utilize a tanker, generally a relatively large multiple engine airplane, as the tanker and which is specifically designed to carry the fuel supply as well as the flexible hose and other equipment necessary for transferring the fuel to the receiving aircraft. The use of flexible hose has been found to be objectionable in several ways. For example, when the hose is unreeled from the tanker aircraft its free end, which carries the coupling for connection to the receiving aircraft, often whips around in the airstream making it difficult for the receiving aircraft to establish contact therewith. Further, the free end of the hose very often collides with either the tanker or the receiving aircraft frequently damaging either or both. It has also been found that at high altitudes the flexible hose tends to freeze and become brittle, due to the low ambient temperature, and as a result becomes difficult to handle and may even crack or break due to its brittle condition. Additionally, the necessity of having an aircraft of such limited use as a tanker is particularly objectionable in the operation of military aircraft where every aircraft should be utilized to its fullest extent.

Therefore, the present invention contemplates an in-flight refueling assembly for association with an aircraft, or a component thereof, wherein the means for transferring the fuel comprises a substantially rigid, articulated conduit that is adapted to be stored within the tanker or supply aircraft or in a component thereof and which may be projected threfrom for and during the in-flight refueling operation. Thus, through the present invention, it is possible to eliminate the objectionable features of the flexible hose as hereinbefore set forth. Moreover, the present invention is so constructed and arranged that it may be associated with an aircraft component such as external fuel tank, to the end that a military aircraft, for example a fighter or fighter-bomber, may be converted readily into a tanker aircraft that can be used for the in-flight refueling of aircraft of the same or different type, thereby eliminating the need for specifically designed tankers or fuel supply aircraft.

Even under the most ideal conditions, in-flight refueling is a hazardous operation in that it is necessary for the tanker or supply aircraft and the receiving aircraft to come within close proximity to each other in order to effect the transfer of fuel. Because of this close proximity of the aircraft, both pilots must devote maximum attention to the flying of their respective aircraft.

Therefore, the refueling assembly contemplated herein embodies means whereby the transfer or delivery of fuel from the tanker to the receiving aircraft is controlled by the pilot of the latter in such a manner that he may devote his maximum attention to the flying of his aircraft. In other words, the delivery of the fuel is controlled through the position of the receiving aircraft relative to the tanker.

While the in-flight refueling assembly contemplated herein may be associated with either the fuselage, wing or other part of an aircraft, it is particularly adapted to be associated with an external fuel tank that may be fixedly or releasably secured to an aircraft. Therefore, the present invention has been illustrated and described in conjunction with an external fuel tank of an aircraft which may be maintained filled from the internal tanks of the supply aircraft if desired.

Figure 2:
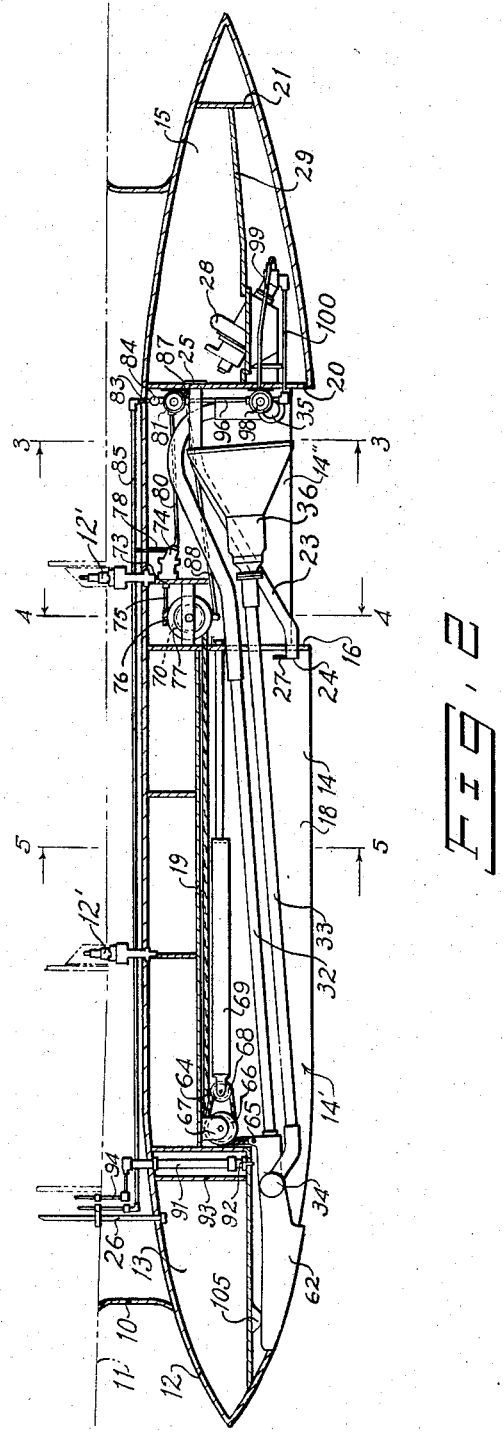
Fig. 2 is a longitudinal sectional view through the tank shown in Fig. 1.
Figure 4:
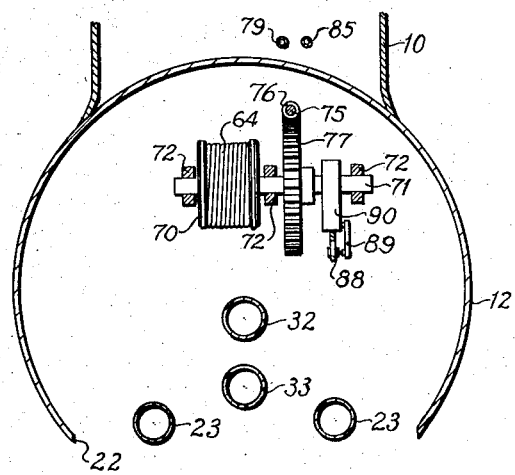
Fig. 4 is a transverse section taken along line 4—4 of Fig. 2.

Referring more particularly to the drawings, in Figs. 1 and 2, 10 designates a conventional pylon assembly mounted to the lower or bottom portion of an aircraft 11 as, for example, the underside of its wing or fuselage. An external fuel tank 12 is fixed to the aircraft or is releasably attached to the pylon 10 by conventional attachment means 12' carried in part by the pylon 10 and in part by the tank 12.

Figure 5:
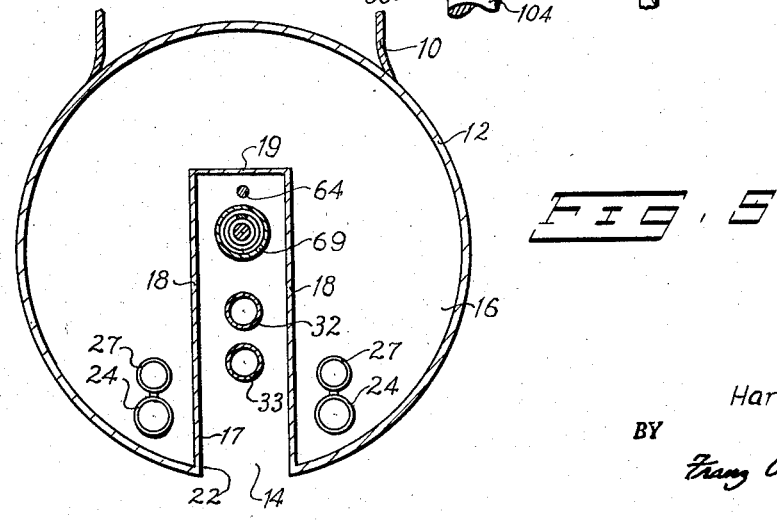
Fig. 5 is a transverse sectional view taken along line 5—5 of Fig. 2.

To adapt the tank 12 for use with the in-flight refueling assembly hereof, its interior is divided by suitably arranged walls and bulkheads into a forward compartment 13, a central compartment 14 and an aft compartment 15. As shown in Figs. 2 and 5, a circular bulkhead 16 having a substantially rectangular cut-out 17 extending inwardly from its edge and along its diameter, is disposed within the central compartment 14 and transversely across the interior of the tank 12 adjacent to, but spaced slightly aft of its longitudinal center. This bulkhead 16 is positioned with the open end of the cut-out 17 adjacent the bottom of the tank 12 and is secured at its periphery to the inner surface of the tank 12 by any suitable means, A pair of vertical longitudinal walls 18 spaced from, but parallel to, each other and a horizontal longitudinal end wall 19 joined to, or formed integrally with, the upper edges of the walls 18, are suitably secured at their aft ends to the bulkhead 16 so as to be disposed about and enclose the cut-out 17. These walls 18 and 19 extend forwardly to a point adjacent the nose or forward end of the tank 12 where their ends are joined to the tank 12. The lower edges of the walls 18, which are formed to follow the contour of the lower portion of the tank 12, are also joined or secured to the adjacent portion of the tank 12. Spaced aftwardly of the bulkhead 16 and from each other, are a pair of circular bulkheads 20 and 21 that are disposed transversely across the interior of the tank 12 and secured by their respective peripheries to the tank 12 to define therewith the aft compartment 15 of the tank.

Due to the foregoing arrangement, the bulkhead 16 and the walls 18 and 19 combine with the wall of the tank 12 to define the forward compartment 13 which serves for the storage for fuel. The walls 18 and 19 and the bulkhead 16 combine with the wall of the tank 12 to define a relative narrow forward portion 14' of the central compartment 14 and the bulkheads 16 and 20 combine with the wall of the tank 12 to define a relatively wide aft portion 14'' of the compartment. These portions 14' and 14'' of the irregularly shaped central compartment 14 serve to snugly house the equipment necessary for the transfer of fuel from the tank 12 and its compartments to a receiving aircraft, not shown. The bulkheads 20 and 21 cooperate with the adjacent wall of the tank 12 to define the aft compartment 15 which also serves as a storage space for fuel, as well as to house a pumping unit 28 for the ultimate feeding of fuel to the receiving aircraft.

Since the forward and aft compartments 13 and 15, respectively, are intended to carry fuel, the various joints between the bulkheads 16, 20 and 21 and the walls 18 and 19, and the wall of the tank 12, as well as the joints between the walls 18 and 19 and the bulkhead 16 are fluid-tight to prevent leakage from the tank and its compartments.

For purposes that will hereinafter be apparent, the bottom portion of the wall of the tank 12 between the lower edges of the walls 18 and between the bulkheads 16 and 20 is removed to form a longitudinal aperture 22 in the bottom of the tank 12 opening into both portions 14' and 14'' of the central compartment 14. The aperture 22 may be provided with any suitable door assembly and an actuating mechanism therefor, not shown, which may be of the type normally associated with the bombbay of an aircraft.

The forward fuel compartment 13 communicates with the aft fuel storage and pumping compartment 15 by way of a pair of conduits 23, each having an inlet 24 extending through the lower part of the bulkhead 16 into aft end of the compartment 13 and an outlet 25 extending through the upper part of the bulkhead 20 into the compartment 15. The forward compartment 13 is pressurized in any conventional manner as, for example, by means of a conduit 26 that is connected to a suitable source of fluid pressure, not shown, in the aircraft 11, to the end that the fuel stored therein is forced through the conduits 23 upwardly into the aft compartment 15. To prevent the pressurization of the aft compartment 15 after the fuel has been transferred to it from the compartment 13, each inlet 24 is provided with a conventional float-type, flapper valve assembly 27 that serves to close it when the fuel in the compartment 13 falls below a predetermined level. Thus, when substantially all of the fuel has been forced from the compartment 13 into the compartment 15, the valves 27 close their respective inlets 24 thereby preventing the passage of pressurizing fluid into the aft compartment 15.

Figure 6:
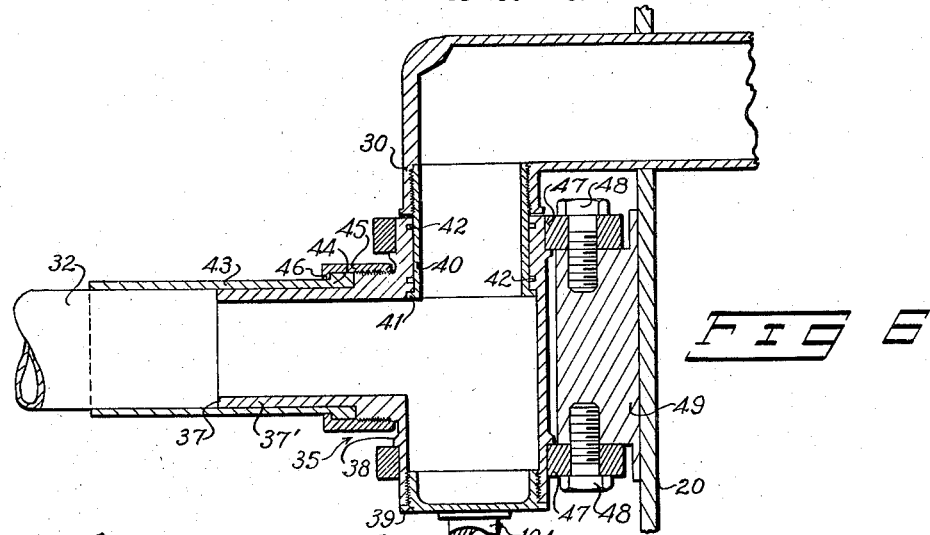
Fig. 6 is a longitudinal section through a universal joint of the instant assembly situated within the tank and after adjustment through 90° from the position shown in Fig. 3.

The in-flight refueling assembly contemplated herein whereby the fuel from the tank 12 may be transferred or delivered to a receiving aircraft comprises a conventional, hydraulically driven pump 28 that is mounted by a suitable supporting structure 29 within the aft compartment 15. The inlet, not shown, of the pump 28 is disposed within the compartment 15 so as to draw the fuel therefrom upon its operation, while its outlet 30 extends forwardly through the bulkhead 20 and into the portion 14'' of the compartment 14 where the outer end thereof is disposed, as shown in Fig. 6, parallel to the bulkhead 20 and transversely of the tank 12.

An articulated fuel delivery conduit comprising upper and lower, rigid tubes 32 and 33, interconnected by a universal joint 34 so as to be relatively foldable to be disposed either substantially parallel or angularly to each other, is connected at the upper end of its upper tube 32 by a universal joint 35 to the outlet 30 of the pump 28. The opposite or lower end of the articulated conduit 32—33, i.e., the outer end of lower tube 33 thereof, is provided with a conventional drogue assembly 36 for connection to the probe of the receiving aircraft, not shown. As will be more fully set forth, the articulated conduit 32—33 is constructed and arranged to be stored within the compartment 14 as shown in Fig. 2, and to be projected from and retracted into said compartment. When retracted as aforesaid nearly the full length of the tubes 32 and 33 rest parallel and are housed in the relatively narrow forward portion 14' of compartment 14 while the drogue assembly 36 and part of the length of said tubes are received and housed in the relatively wide aft portion 14''.

As described, the articulated conduit 32—33 is mounted to the outlet 30 of the pump 28 by means of a universal joint or connection 35. As shown in Fig. 6 this universal joint 35 comprises a T-fitting 37 having a neck 37' and a transverse duct 38 disposed across and normal to the neck 37'. The duct 38 is closed at one end by an end plug 39, while the opposite end has mounted therein a hollow bearing 40 having an outstanding flange 41 at one extremity that engages an internal shoulder formed in the duct 38 and external threads at its opposite extremity that engage internal threads formed in the outer end of the outlet 30. The engagement between the duct 38 and the bearing 40 is such that the former is free to rotate on the latter. Leakage between the adjacent surfaces of the duct 38 and bearing 40 is prevented by conventional seals 42. The upper end of the tube 32 is inserted partially in and fixedly secured to a sleeve 43 that forms a continuation of the tube 32 and which is provided with an outstanding peripheral flange 44 at its end adjoining the duct 38. The neck 37' of the T-fitting 37 is received within the sleeve 43 with the duct 38 disposed across and adjacent to the flange 44. The sleeve 43, and hence the tube 32, is held in engagement with the T-fitting 37 by a retaining collar 45 having an inwardly projecting flange 46 that engages over the flange 44 and which is internally threaded at its opposite end to engage a threaded portion of the neck 37' adjacent the duct 38. By the engagement of the flange 44 by the collar 45 the sleeve 43, and hence the upper tube 32, is free to rotate about its longitudinal axis on the neck 37' of the T-fitting 37. Thus, the universal joint 35 not only serves to mount the tube 32 to the pump outlet 30 for pivotal or rotary movement both about an axis longitudinal of tube 32 and an axis transverse or normal thereto, but also to connect the tube 32 to the outlet 30 to receive the output of the pump 28. To further support this connection between the tube 32 and pump outlet 30, a pair of spaced bearings 47, in which the duct 38 is rotatably supported, is mounted by bolts 48 to a support member 49 that is conventionally secured to the bulkhead 20.

Figure 7:
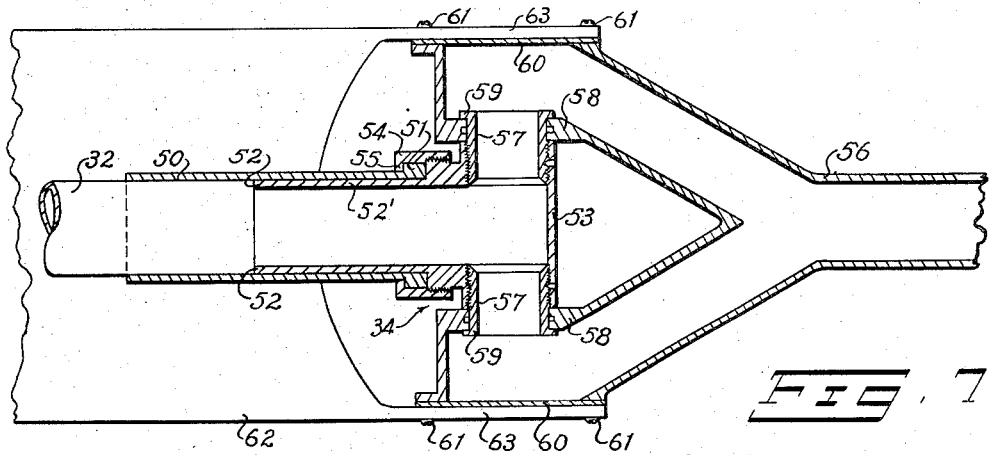
Fig. 7 is a longitudinal section through another of the universal joints of the instant assembly taken along line 7—7 of Fig. 1.

As above set forth, the upper and lower tubes 32 and 33 are interconnected by a universal joint 34. As shown in Fig. 7, this joint 34 comprises a sleeve 50 that is fixedly secured to the lower end of the tube 32 to form a continuation thereof, and which has an outstanding flange 51 formed at its lower end. Like the joint 35, the joint 34 includes a T-fitting 52 having a neck 52' slidably received within the sleeve 50 and a transverse duct 53 disposed normal to its neck and to the flange 51 of the sleeve 50. The T-fitting 52 is secured to the sleeve 50 by a retaining collar 54 having an inwardly extending flange 55 at one of its ends that engages the flange 51 and an internally threaded portion at its opposite end that engages external threads formed on the neck 52' of the T-fitting 52 adjacent its duct 53. By this arrangement, the T-fitting 52 and the tube 32 are mounted for rotary movement relative to each other about the longitudinal axis of the tube 32. The duct 53 of the T-fitting 52 is connected to a Y-fitting 56 carried by the upper end of the lower tube 33, by means of a pair of hollow bearings 57 that are rotatably mounted in and extend through the adjacent side walls 58 of the Y-fitting 56 into the duct 53 of the T-fitting 52. Each bearing 57 is provided at one end with an outstanding peripheral flange 59 that engages the inner surface of the adjacent side wall 58, while its opposite end is threadedly engaged with coacting internal threads formed in the transverse duct 53. To permit assembling and servicing of the universal joint 34, the outside walls of the Y-fitting 56 are formed by plates 60 that are removably secured in position by any conventional means such as bolts 61. Because of the foregoing construction and arrangement, the bearings 57 are engaged with the T-fitting 52 for rotation therewith, and also are rotatably mounted in the side walls 58 of the Y-fitting 56. Accordingly it is apparent that the joint 34 serves to connect the upper and lower tubes 32 and 33 so as to allow them to be folded and permit the retraction and storage of the articulated conduit 32—33 within the compartment 14 as shown in Fig. 2. The universal joint 35 mounts the articulated conduit 32—33 to swing through an arc A—D in substantial fore and aft alignment with the longitudinal axis of the tank 12 as shown in Fig. 1, and cooperates with the joint 34 to permit it to swing transversely or laterally thereof as well.

When the articulated conduit is projected, as will be set forth, the lower tube 33 and the drogue assembly 36 carried thereby are held in a substantially horizontal position and in fore and aft alignment with the tank 12 by the action of the airstream passing over the drogue assembly 36. To stabilize the tube 33 and the drogue assembly 36 in this position, a counter-weight 62 having spaced arms 63 secured thereto at its aft end, is fixedly secured by the arms 63 to the side plates 60 of the Y-fitting 56 by any suitable means so as to extend forwardly of the Y-fitting 56. If desired, the bolts 61 may be used for this purpose. Because of the foregoing construction and arrangement, the weight 62 tends to rotate the tube 33 in a counter-clockwise direction, as viewed in Fig. 1, on the bearings 57, thereby counter-balancing the weight of the tube 33 and the drogue assembly 36. As a result, the weight 62 assists in stabilizing the tube 33 and the drogue assembly 36 in the horizontal position. If desired, the bottom surface of the weight 62 may be shaped to form a continuation of the contour of the forward portion of the tank 12, and thereby serve to close this portion of the aperture 22 when the articulated conduit 32—33 is in its retracted position as shown in Fig. 2.

To provide means for projecting or retracting the articulated conduit 32-33 out of and into the compartment 14 and for securing it therein in its retracted position, a cable 64 is secured at one of its ends to an eye 65 carried by, or otherwise secured to, the sleeve 50 of the joint 34. From the eye 65, the cable 64 passes to and is reeved over one groove of a double grooved pulley 66 rotatably supported in a bracket 67 secured to the lower surface of the wall 19 so as to position the pulley 66 midway between the walls 18. From the pulley 66 the cable 64 passes to and is reeved over a pulley 68 that is rotatably mounted at one end of a conventional spring capsule 69. The oppoiste end of the capsule 69 is suitably secured to the forward surface of the bulkhead 16 so as to position the capsule 69 within and in fore and aft alignment with the narrow portion 14' of the compartment 14. From the pulley 68, the cable 64 passes back to the pulley 66 where it is reeved over the remaining groove thereof and thence to a drum or windlass 70 where its extremity is fixedly secured. The spring capsule 69 is constructed and arranged to normally contract, i.e. move the pulley 68 away from the pulley 66, to the end that the cable 64 is continually maintained in tension.

The drum 70 is mounted transversely of the portion 14" of the compartment 14 on a shaft 71 that is rotatably supported in a plurality of brackets 72, each of which is secured at one of its ends to the bulkhead 16 and at its opposite end to a support plate 73 suitably mounted in the portion 14" of the compartment 14, aft of the bulkhead 16.

The drum 70 is operated by means of a standard reversible hydraulic motor 74 for rotation in either of two directions to either pay out or unwind the cable 64 from the drum 70 to thereby permit the articulated conduit 32–33 to project or extend from the tank 12 under the force of gravity or to wind the cable 64 about the drum 70 to thereby retract the articulated conduit 32–33 into the tank. More particularly, the hydraulic motor 74 is suitably mounted to the support plate 73 with its driven shaft 75 extending forwardly therethrough. At its forward end, the shaft 75 has a worm 76 that operatively engages a worm gear 77 fixedly mounted on the shaft 71. One side of the motor 74 is connected through a conduit 78 (Fig. 2) to a conduit 79, while its opposite side is connected through a conduit 80 to a control valve 81, which in turn, is connected through a pair of conduits 82 and 83, the latter having a check-valve 84 therein permitting flow only from the valve 81, to a conduit 85. The conduits 79 and 85 are connected to a suitable pilot-operated control means (not shown) but situated within the aircraft 11, that is effective upon operation in either of opposite directions from a neutral position to connect either the conduit 79 or the conduit 85 to the pressure side of a source of fluid under pressure, e. g. the hydraulic system (not shown) of the aircraft 11, and the other or remaining conduit to the return side thereof.

The control valve 81 is so organized and arranged that in one of its positions it communicates the conduit 82 with the conduit 80 and closes conduit 83 to the conruit 80, while in a second position it disconnects the conduits 82 and 80 and communicates the conduit 83 with the conduit 80. Further, the control valve 81 is provided with an actuating lever 87, for moving it between its first and second positions, that is connected through a link 88 to the power arm 89 of a conventional gear reduction assembly 90. The gear reduction assembly 90 is suitably mounted in the compartment 14 and operatively connected to the shaft 71. The relationship between the drum 70, shaft 71, gear reduction assembly 90, power arm 89, link 88 and lever 87 is such that when the articulated conduit is retracted, as shown in Fig. 2, the valve 81 occupies its first position whereby the conduit 82 communicates with the conduit 80. On the other hand, when the shaft 71 and hence drum 70 has rotated through a predetermined number of revolutions sufficient to pay out enough of the cable 64 to permit full projection of the articulated conduit 32–33, as shown in Fig. 1, the foregoing elements cooperate to move the valve 81 to its second position thereby disconnecting the conduit 80 from the conduit 82 and connecting it to the conduit 83. In short, the valve 81 is adjusted by the motor 74 operating through the shaft 71, the gear reduction 90 and link 88.

To project the conduit 32—33 from its retracted position within the compartment 14, the pilot-operated control means is actuated to communicate the conduit 85 with the pressure side of the source of the fluid under pressure and the conduit 79 to the return side thereof. As a result, the fluid under pressure passes through the conduit 85, conduit 82, valve 81 and conduit 80 to the motor 74 and returns from the motor 74 through the conduits 78 and 79. In response to the delivery of fluid under pressure thereto, the motor 74 operates to drive the worm 76, the gear 77 and the shaft 71 in a direction to rotate the drum 70 to unwind or pay out the cable 64. As the cable 64 unwinds from the drum 70, the upper tube 32 pivots or rotates in a counterclockwise direction on the bearing 40 of the universal joint 35 so that its lower end, which carries the weight 62, universal joint 34, lower tube 33 and drogue assembly 36, swings downwardly and aftwardly. As shown in Fig. 1, this swinging movement of the tube 32 moves the universal joint 34 from its fully retracted position indicated as point A (Fig. 1) to its fully projected position indicated at point D. In short, during the projection of the conduit 32–33, the lower portion of the tube 32 carrying the joint 34 swings through the arc 3—D. The rotation of the shaft 71, as aforesaid, also serves to drive the gear reduction assembly 90, and hence the power arm 89, the link 88 and the lever 87, in a direction to move the control valve 81 to its second position so that when the universal joint 34 reaches the downward limit of the arc A—D, the valve 81 has been moved to its second position thereby disconnecting the conduit 82 from the conduit 80 and connecting it to the conduit 83. However, since the conduit 83 is provided with the check-valve 84 permitting flow only from the valve 81, it is manifest that the delivery of fluid under pressure through the conduit 80 to the motor 74 is discontinued when the valve 81 reaches its second position, and, therefore, the motor 74 stops. Thereafter, the worm 76 and its coacting worm gear 77 serve to hold the drum 70 in a fixed position.

As set forth, the paying out of the cable 64 permits the conduit 32-33 to project from the compartment 14 under the force of gravity. However, the aerodynamic loads imposed on it during flight particularly upon the lower exposed surface of the weight 62, may tend to hold the conduit 32–33 in the compartment 14 and counteract its projection. To overcome this, a conventional hydraulic actuator 91, having an extensible stem 92, is mounted in a cylindrical sleeve 93 that is vertically disposed in the forward portion of the compartment 13 and secured at its opposite ends to the wall of the tank 12 and the wall 19. The extensible stem 92 of the actuator 91 passes through the wall 19 into the portion 14' of the compartment 14 to contact the upper surface of the weight 62. The actuator 91 is connected through suitable hydraulic conduits, only one 94, of which is shown, to the hydraulic system, not shown, of the aircraft 11. Conventional pilot-operated means for the control of actuator 91, not shown, is disposed in the aircraft 11 to control the delivery of hydraulic fluid under pressure to this actuator whereby its stem 92 is extended to exert an outward force on the weight 62 that moves it out of the compartment 14 and into the airstream. As the weight 62 is thus moved, the airstream then becomes effective to assist the gravitational forces in projecting the conduit 32-33.

The delivery of the fuel from the tank 12 is controlled by the pilot of the receiving aircraft by maneuvering his airplane to position the conduit 32—33 over a predetermined portion of the arc A—D. In other words, the operation of the pump 28 is controlled by the pivotal or rotary movements of the articulated conduit 32—33 relative to the pump outlet 30. To this end, the valve 81 is connected by a conduit 95 to the conduit 79 and through pressure and return conduits 96 and 97, respectively, to a valve 98 which, in turn, is connected through a pressure conduit 99 and a return conduit 100 (Fig. 2) to the pump 28. The valve 81 is so arranged that when it is moved to its second position, upon the full projection of the conduit 32—33, to thereby disconnect the conduit 80 from the conduit 82 and connect it to conduit 83 as aforesaid, the valve 81 also serves to connect the conduit 82 to the pressure conduit 96 and the return conduit 97 to the conduit 95. Upon the connection of the conduits 82 and 96, the fluid under pressure is delivered from the conduit 85 through the conduit 82, valve 81 and conduit 96 to the valve 98. However, such delivery is not effected until the articulated conduit 32—33 is fully projected and the universal joint 34 thereof has reached the position D on the arc A—D.

The valve 98 is suitably mounted to the bulkhead 20 so as to be positioned adjacent the end plug 39 of the universal joint 35, and is provided with an actuating shaft 101 having a gear 102 fixedly mounted thereon. The gear 102 engages or meshes with a gear 103 fixedly mounted on a shaft 104 that is suitably secured to the end plug 39 for rotation therewith when it rotates with the T-fitting 37 about the axis of rotation of the latter. The valve 98 and gears 102 and 103 are so organized and arranged that as the T-fitting 37 pivots or rotates on the bearing 40, thereby rotating the end plug 39 and the attached shaft 104, the gear 103 drives the gear 102 to move the valve 98 to connect the pressure conduits 96 and 99 and the return conduits 97 and 100 only when the universal joint 34 occupies a position within the portion B—C of the arc A—D. Thus, the valve 98 delivers fluid under pressure to the pump 28 to operate the same but only after the universal joint 34 is positioned at some point within the portion B—C of the arc A—D.

As set forth, when the articulated conduit 32—33 is fully projected from the compartment 14, the lower tube 33 and the drogue assembly 36 carried at the aft end thereof are substantially horizontal relatively to, and in fore and aft alignment with, the tank 12. Moreover, the valve 81 is positioned to connect the fluid under pressure to the valve 98, but the latter valve is closed so that the pump 28 is not operating. To effect the transfer of fuel from the tank 12 to the receiving aircraft, the pilot of the receiving aircraft maneuvers his aircraft to insert a conventional probe assembly (not shown) into the drogue assembly 36 to establish a connection therewith. Thereafter, the receiving aircraft is maneuvered to exert a forward thrust on the drogue assembly 36 that moves the delivery conduit 32—33 in a forwardly direction so that universal joint 34 moves through the portion D—C and into the portion C—B of the arc A—D. This movement of the conduit 32—33 is transmitted through the T-fitting 37 and the gears 102 and 103 to the valve 98 to move it to its open position where it connects the pressure conduits 96 and 99 and the return conduits 97 and 100. As a result, the fluid under pressure is delivered through the conduits 85 and 82, the valve 81, the conduit 96, the valve 98 and the conduit 99 to the pump 28 to actuate it. Upon its operation, the pump 28 draws fuel from the compartment 15 and pumps it through the outlet 30 into the delivery conduit 32—33. The fuel then passes through the conduit 32—33, the drogue assembly 36 and the probe assembly (not shown) into the receiving aircraft. The pilot of the receiving aircraft has complete control of the delivery of fuel as aforesaid by maneuvering his aircraft to maintain the universal joint 34 at some point with the portion B—C of the arc A—D and thereby continue the delivery of fuel or, conversely, to move it to a position within the portions A—B or C—D of the arc A—D and thereby close the valve 98 and discontinue the operation of the pump 28 and, hence, the delivery of fuel.

Upon the completion of the refueling operation, the pilot of the receiving aircraft withdraws the probe assembly from the drogue assembly 36 by decreasing the speed of the receiving aircraft. During this disconnection the conduit 32—33 is returned to its fully projected position and the universal joint 34 occupies the position D on the arc A—D. As a result, the valve 98 is closed by and during the disconnecting operation and the pump 28 is stopped.

To effect the retraction of the conduit 32—33 into the compartment 14 upon the completion of the refueling operation, the pilot-operated control means is moved to connect the conduit 79 to the pressure side of the source of fluid under pressure and the conduit 85 to the return side thereof. Under these conditions, the fluid under pressure is delivered through the conduits 79 and 78 to the motor 74 causing it to operate in a reverse direction as compared to its operation when the conduit 85 is connected to the pressure side of the source of fluid under pressure. Since the valve 81 already has been moved to its second position during the projection of the conduit 32—33, the fluid under pressure is initially returned from the motor 74 through the conduit 80, valve 81, conduit 83, check-valve 84 and conduit 85 to the return side of the source of fluid under pressure. As a result, the motor 74 drives the worm gear 76 and its coacting gear 77 to rotate the shaft 71 and hence the drum 70 in a direction to wind the cable 64 onto the drum 70. Upon the winding of the cable 64 about the drum 70, the upper tube 32 pivots or rotates on the bearing 40 in a clockwise direction (Fig. 1) and the conduit 32—33 is retracted into the compartment 14. During this retraction, as the lower end of the tube 32 approaches the aperture 22 to the compartment 14, the cable 64 aligns the tube 32, as well as the lower tube 33, and the drogue assembly 36 carried thereby with the opening 22 and the compartment 14.

The reverse operation of the shaft 71 also drives the gear reduction assembly 90 and its power arm 89 in a reverse direction so that the link 88 and the actuating lever 87 return the valve 81 to its first postion whereby the conduit 80 is connected to the conduit 82 and disconnected from the conduit 83. However, as the conduit 82 as well as the conduit 83 are both connected to the conduit 85, and the check-valve 84 permits flow from the valve 81 to the conduit 85, it is manifest that the return from the motor 74 is unaffected by the changing of the valve 81 from its second position to its first position during the retraction of the conduit 32—33. Moreover, it is apparent that when this conduit 32—33 has been fully retracted into the compartment 14, the valve 81 has been positioned to permit its subsequent projection when desired. As hereinbefore set forth, the valve 81 connects the conduit 82 to the pressure conduit 96 and conduit 95 to the return conduit 97 only when it is in its second position and the conduit 32—33 is fully projected. Therefore, upon the reverse operation of the shaft 71 and the resulting movement of the valve 81 by the link 88 and arm 87 from its second position to its first position, the valve 81 is closed to the pressure conduit 96 and return conduit 97 and hence no pressurized fluid is delivered to the pump 28 during the retraction of the conduit 32—33.

When the articulated conduit 32—33 has been fully retracted into the compartment 14, as aforesaid, the pilot-operated control means is returned to neutral thereby discontinuing the delivery of fluid under pressure to the conduit 79 and hence to the motor 74. Thereupon, motor 74 is stopped and thereafter the drum 70 is held in a fixed position by the coaction between the worm 76 and the worm gear 77 to secure the conduit 32—33 in its retracted position. A suitable signal may be provided for indicating to the pilot when the delivery conduit 32—33 has reached its fully retracted position, or this signal may be adapted to move the pilot-operated control means to neutral when the conduit 32—33 reaches its fully retracted position.

Figure 3:
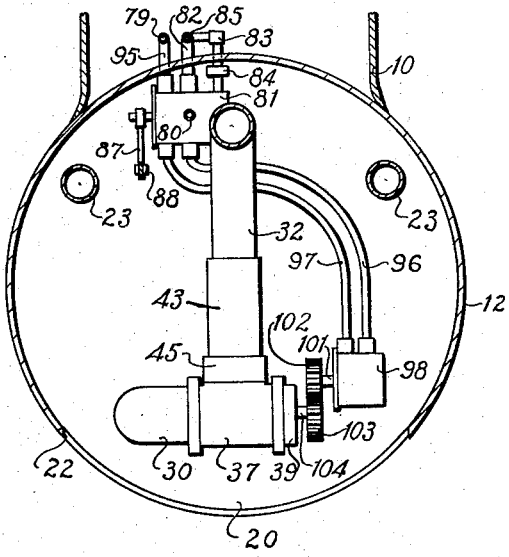
Fig. 3 is a transverse sectional view through the tank taken along line 3—3 of Fig. 2.

As shown in Fig. 3, when the articulated delivery conduit 32—33 has been retracted into the compartment 14, the lower tube 33 and the drogue assembly 36 are elevated slightly above the horizontal. To accomplish this movement of the lower tube 33, a resilient member or bumper 105 is mounted on the wall 19 and positioned to contact the upper surface of the forward end of the weight 62. Therefore, as the cable 64 draws the conduit 32—33 into the compartment 14, the forward end of the weight 62 contacts the bumper 105 causing the tube 33 to pivot in a counter-clockwise direction about the bearings 57 to raise the drogue assembly 36 completely into the compartment 14 as shown in Fig. 2.

What is claimed is:

1. An in-flight refueling assembly comprising a tank for containing a fuel, a chamber in said tank, an articulated conduit having one of its ends pivotally mounted in said chamber and retractable into and extensible from said chamber, means mounted in said chamber and connected to said conduit for retracting and extending said conduit into and out of said chamber, a pump mounted in said tank for pumping the fuel from said tank and having an outlet disposed in said chamber, means connecting the pivotally mounted end of said conduit to said pump outlet whereby said conduit receives the fuel from said pump, valve means mounted in said chamber and connected to and controlling the operation of said pump, and means operatively connecting said valve means to said conduit whereby pivotal movements of said conduit control the operation of said pump to thereby regulate the delivery of the fuel from said tank to said conduit.

2. The combination with an aircraft of an inflight refueling assembly for refueling a receiving aircraft comprising a tank for containing a fuel, means for releasably attaching said tank to said aircraft, a pump mounted in said tank for pumping fuel therefrom and having an outlet, a conduit mounted at one of its ends to the outlet of said pump for pivotal movement relative thereto, and for retraction into and extension from said tank, means connected to said conduit for retracting and extending said conduit into and from said tank, means associated with said pump for controlling the operation of said pump and connected to said conduit whereby the operation of said pump is controlled by pivotal movement of said conduit relative to said pump outlet and whereby the partial retraction of the conduit during the engagement thereof by the receiving aircraft initiates the operation of said pump, and means operated by said conduit retracting and extending means and connected to said pump control means to prevent the operation of said pump during the complete retraction or extension of said conduit.

3. The combination with an aircraft, of an inflight refueling assembly comprising a tank for containing a fuel, means for releasably attaching said tank to the exterior of said aircraft, a pump mounted in said tank for delivering fuel therefrom and having an outlet, a conduit mounted at one of its ends to the outlet of said pump for pivotal movement relative thereto and to be retracted into and extended from said tank, means connected to said conduit for retracting and extending it, means for controlling the operation of said pump, means interconnecting said pump control means and said conduit whereby the operation of said pump is controlled by pivotal movement of said conduit relative thereto, and means operated by said conduit retracting and extending means and connected to said pump control means to prevent the operation of said pump during the retraction and extension of said conduit.

4. In an in-flight refueling assembly, the combination comprising a tank for containing a fuel, a pump mounted in said tank for delivering the fuel therefrom and having an outlet, a conduit connected to the outlet of said pump and mounted for pivotal movement relative thereto and for retraction into and extension out of said tank, means connected to said conduit for retracting or extending said conduit, means associated with said pump for controlling the operation of said pump and connected to said conduit whereby the operation of said pump is controlled by the pivotal movements of said conduit relative thereto, and means connected to said conduit retracting and extending means and to said pump control means to prevent the operation of said pump during the retraction and extension of said conduit.

5. An in-flight refueling assembly comprising an external tank for containing a fuel, a chamber in said tank, an articulated conduit having one of its ends pivotally mounted in said chamber and retractable into and extensible from said chamber, means mounted in said chamber and connected to said conduit for retracting and extending said conduit into and out of said chamber, means associated with said tank for delivering the fuel from said tank and having an outlet disposed in said chamber, means connecting the pivotally mounted end of said conduit to the outlet of said fuel delivery means, valve means connected to and controlling the operation of said fuel delivery means, and means operatively connecting said valve means to said conduit whereby pivotal movements of said conduit control the operation of said fuel delivery means to thereby regulate the delivery of the fuel from said tank to said conduit.

6. An in-flight refueling assembly comprising an external tank for containing a fuel, a chamber in said tank, an articulated conduit having one of its ends pivotally mounted in said chamber and retractable into and extensible from said chamber, means for delivering fuel from said tank to said articulated conduit, means mounted in said chamber and connected to said conduit for retracting and extending said conduit into and out of said chamber, valve means mounted in said chamber and connected to and controlling the operation of said delivery means, and means operatively connecting said valve means to said conduit whereby pivotal movements of said conduit control the operation of said delivery means to thereby regulate the delivery of the fuel from said tank to said conduit.

References Cited in the file of this patent

UNITED STATES PATENTS

| | | |
|---|---|---|
| 1,969,360 | Daley | Aug. 7, 1934 |
| 2,138,970 | Jones | Dec. 6, 1938 |
| 2,388,013 | Rasor | Oct. 30, 1945 |
| 2,504,269 | Logan | Apr. 18, 1950 |
| 2,538,719 | Wing Shee et al. | Jan. 16, 1951 |
| 2,573,207 | Lipman | Oct. 30, 1951 |
| 2,640,549 | Isacco | June 2, 1953 |
| 2,663,523 | Leisy | Dec. 22, 1953 |
| 2,692,102 | Cobham | Oct. 19, 1954 |
| 2,713,981 | Lansing | July 26, 1955 |
| 2,760,777 | Cotton | Aug. 28, 1956 |

OTHER REFERENCES

"Flight," vol. LXII, issue 2284 of October 31, 1952, page 567.